US009103271B2

(12) United States Patent
Bidner et al.

(10) Patent No.: US 9,103,271 B2
(45) Date of Patent: Aug. 11, 2015

(54) EXHAUST LEAKAGE MANAGEMENT

(71) Applicant: Ford Global Technologies, LLC, Dearborn, MI (US)

(72) Inventors: David Karl Bidner, Livonia, MI (US); Christopher House, Belleville, MI (US); Chad Stateler, Carleton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 205 days.

(21) Appl. No.: 13/857,045

(22) Filed: Apr. 4, 2013

(65) Prior Publication Data
US 2014/0298800 A1 Oct. 9, 2014

(51) Int. Cl.
| | |
|---|---|
| *F02B 25/06* | (2006.01) |
| *F02D 23/00* | (2006.01) |
| *F02B 33/44* | (2006.01) |
| *F02B 27/04* | (2006.01) |
| *F01N 3/00* | (2006.01) |
| *F02B 37/18* | (2006.01) |
| *F02B 39/14* | (2006.01) |
| *F01M 13/00* | (2006.01) |

(52) U.S. Cl.
CPC ............. *F02B 37/183* (2013.01); *F01M 13/00* (2013.01); *F02B 39/14* (2013.01); *Y02T 10/144* (2013.01)

(58) Field of Classification Search
CPC .................................................... F02B 37/183
USPC ........... 60/605.2, 602, 273, 27; 123/572–574; 417/407; 137/312; 251/21
See application file for complete search history.

(56) References Cited

U.S. PATENT DOCUMENTS

| | | | | |
|---|---|---|---|---|
| 4,171,936 | A | * | 10/1979 | Hageman et al. ............. 417/407 |
| 4,454,852 | A | * | 6/1984 | Hasegawa ...................... 123/480 |
| 5,445,248 | A | * | 8/1995 | Clarke et al. .................. 188/273 |
| 5,941,506 | A | * | 8/1999 | Smith et al. ................ 251/335.3 |
| 6,089,019 | A | * | 7/2000 | Roby et al. ................... 60/605.2 |
| 6,205,784 | B1 | | 3/2001 | Knaack et al. |
| 6,217,001 | B1 | * | 4/2001 | Gluchowski et al. ..... 251/129.07 |
| 6,394,078 | B1 | * | 5/2002 | Kling ............................ 123/572 |
| 6,418,916 | B1 | * | 7/2002 | Newmann et al. ............ 123/572 |
| 7,210,295 | B2 | | 5/2007 | McEwen |
| 2008/0083399 | A1 | * | 4/2008 | Hirano et al. ................. 123/572 |
| 2011/0277733 | A1 | * | 11/2011 | Spix et al. ..................... 123/574 |
| 2014/0003908 | A1 | * | 1/2014 | House ............................... 415/1 |
| 2014/0144135 | A1 | * | 5/2014 | Gupta et al. ................... 60/602 |

FOREIGN PATENT DOCUMENTS

| | | | | |
|---|---|---|---|---|
| EP | 1327753 | A1 | 7/2003 | |
| EP | 1486678 | A2 | 12/2004 | |
| EP | 1486678 | B1 | 10/2011 | |
| GB | 2401652 | A * | 11/2004 | ............... F02C 6/12 |
| JP | 55072624 | A * | 5/1980 | ............... F01N 7/08 |

* cited by examiner

*Primary Examiner* — Thomas Denion
*Assistant Examiner* — Jessica Kebea
(74) *Attorney, Agent, or Firm* — Julia Voutyras; Alleman Hall McCoy Russell & Tuttle LLP

(57) ABSTRACT

Embodiments may provide an exhaust gas management arrangement for an engine. The exhaust gas management arrangement may include a port disposed to capture an exhaust gas leaked from a movable portion of an exhaust gas flow directing mechanism. The arrangement may also include a passage to direct the leaked exhaust gas to a crankcase of the engine.

16 Claims, 5 Drawing Sheets

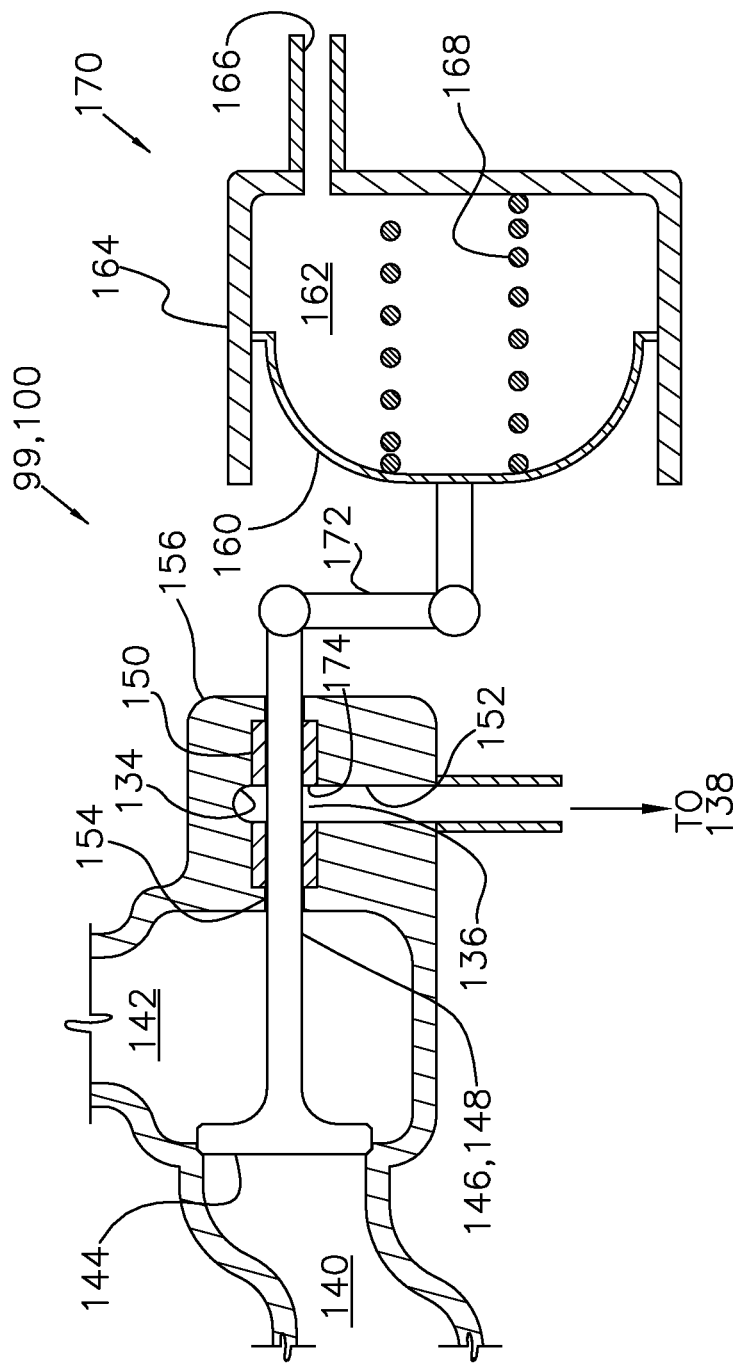

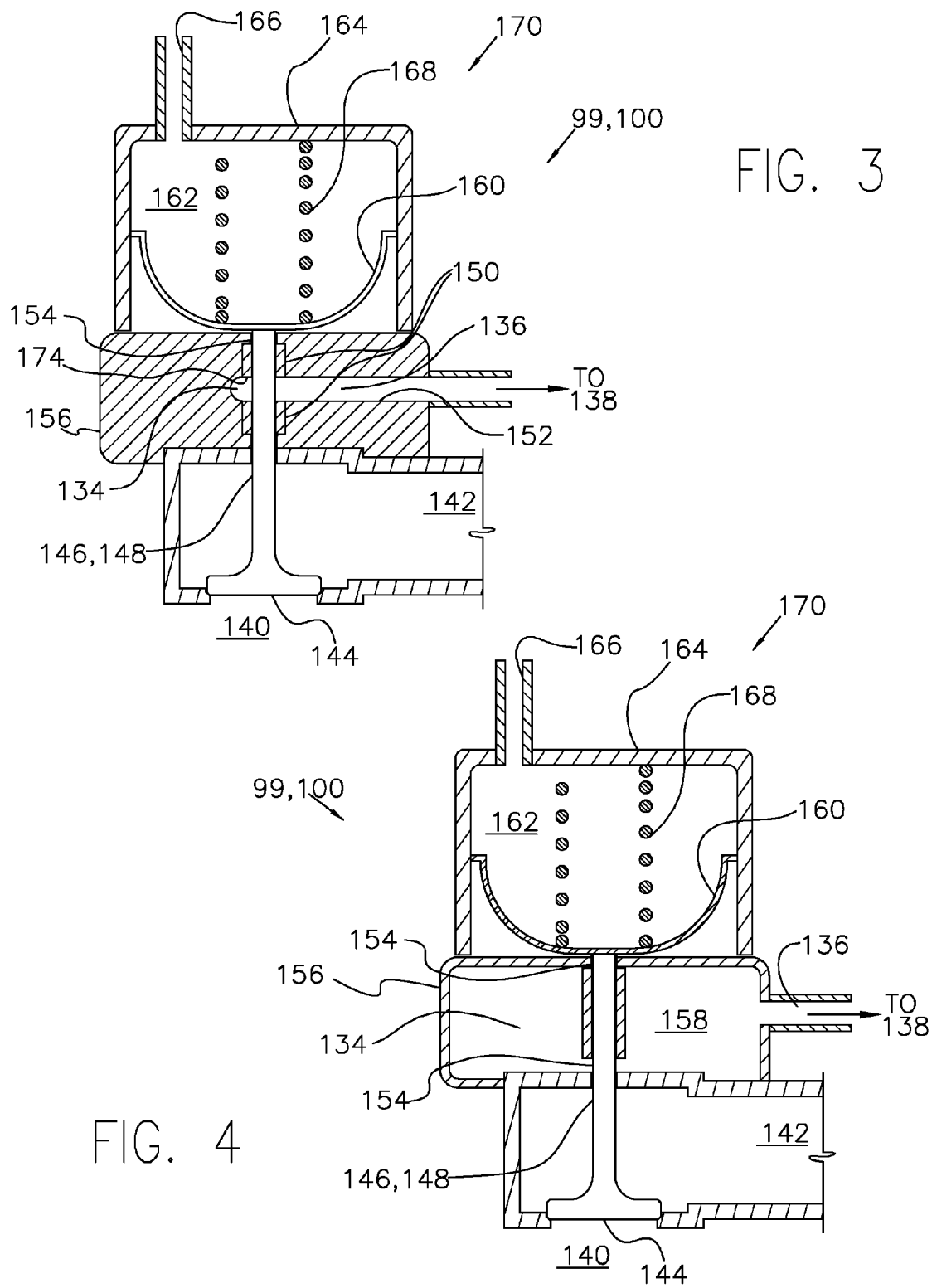

EXHAUST LEAKAGE MANAGEMENT

FIELD

The present application relates to controlling, and/or managing possible exhaust gas leaks from various engine components and directing the leaks to a crankcase ventilation system for more advantageous handling.

BACKGROUND AND SUMMARY

Internal combustion engines often include techniques to improve various engine characteristics. But, an advantageous technique applied to one part of the engine may negatively affect other engine characteristics by introducing complexity and/or additional components.

One example technique for reducing nitrogen oxides (NOx) emissions from engine exhaust; formed when nitrogen and oxygen in the intake air is subjected to high combustion temperatures; is Exhaust Gas Recirculation (EGR) wherein a portion of cooled exhaust gas is recirculated back to the engine's combustion chamber(s) and mixed with the intake air. Another technique to increase power output is to add a turbocharger by capturing the power of exhaust gases to drive a compressor and increase the intake air density. However, including a turbocharger in an engine may make the management of possible undesirable exhaust byproducts more difficult.

U.S. Pat. No. 6,089,019 discloses an attempt to address the added complexity of combining a turbocharger with Exhaust Gas Recirculation (EGR). Specifically, in a turbocharged engine, the intake gas is typically at a higher pressure than the exhaust gas. But, in order to recirculate exhaust gas into the intake manifold, the exhaust gas must be at a higher pressure than the intake gas. The disclosure proposes placing a restrictor valve on the exhaust line upstream from the turbocharger, to restrict the flow of exhaust and increase the pressure of the exhaust gas. The increased pressure exhaust gas is provided to the inlet of an exhaust gas recirculation EGR valve actuatable independently of the actuation of the restrictor valve.

The inventors herein have recognized a number of problems with this approach. For one, there are other areas in an engine where untreated exhaust may be emitted into the atmosphere, for example areas in a turbocharged engine. Embodiments in accordance with the present disclosure may provide a way to reduce emissions that may otherwise leak from, or otherwise pass from, various moving components.

Embodiments in accordance with the present disclosure may provide an exhaust gas management arrangement for an engine. The exhaust gas management arrangement may include a port disposed to capture an exhaust gas leaked from a movable portion of an exhaust gas flow directing mechanism. The arrangement may also include a passage to direct the leaked exhaust gas to a crankcase of the engine. In this way, leaks may be controlled and instead be treated in accordance with preferred and/or established methods.

Some embodiments may provide a turbocharger wastegate for an engine including an enclosure in sealing engagement with a leakage possible portion of the wastegate. The wastegate may also include a fluid path from the enclosure to a positive crankcase ventilation (PCV) system to move exhaust gas leaked from the wastegate to a crankcase of the engine. The fluid path may include an oil return line for a bearing of the turbocharger. In this way, gasses leaked from the wastegate may be managed, and/or handled by the PCV system rather than be leaked to the atmosphere.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 2 is a cross-sectional view of an example turbocharger wastegate in that may be used with the example engine illustrated in FIGS. 1a-1c.

FIG. 3 is a cross-sectional view of another example turbocharger wastegate in that may be used with the example engine illustrated in FIGS. 1a-1c.

FIG. 4 is a cross-sectional view of another example turbocharger wastegate in that may be used with the example engine illustrated in FIGS. 1a-1c.

DETAILED DESCRIPTION

Figure 1A:
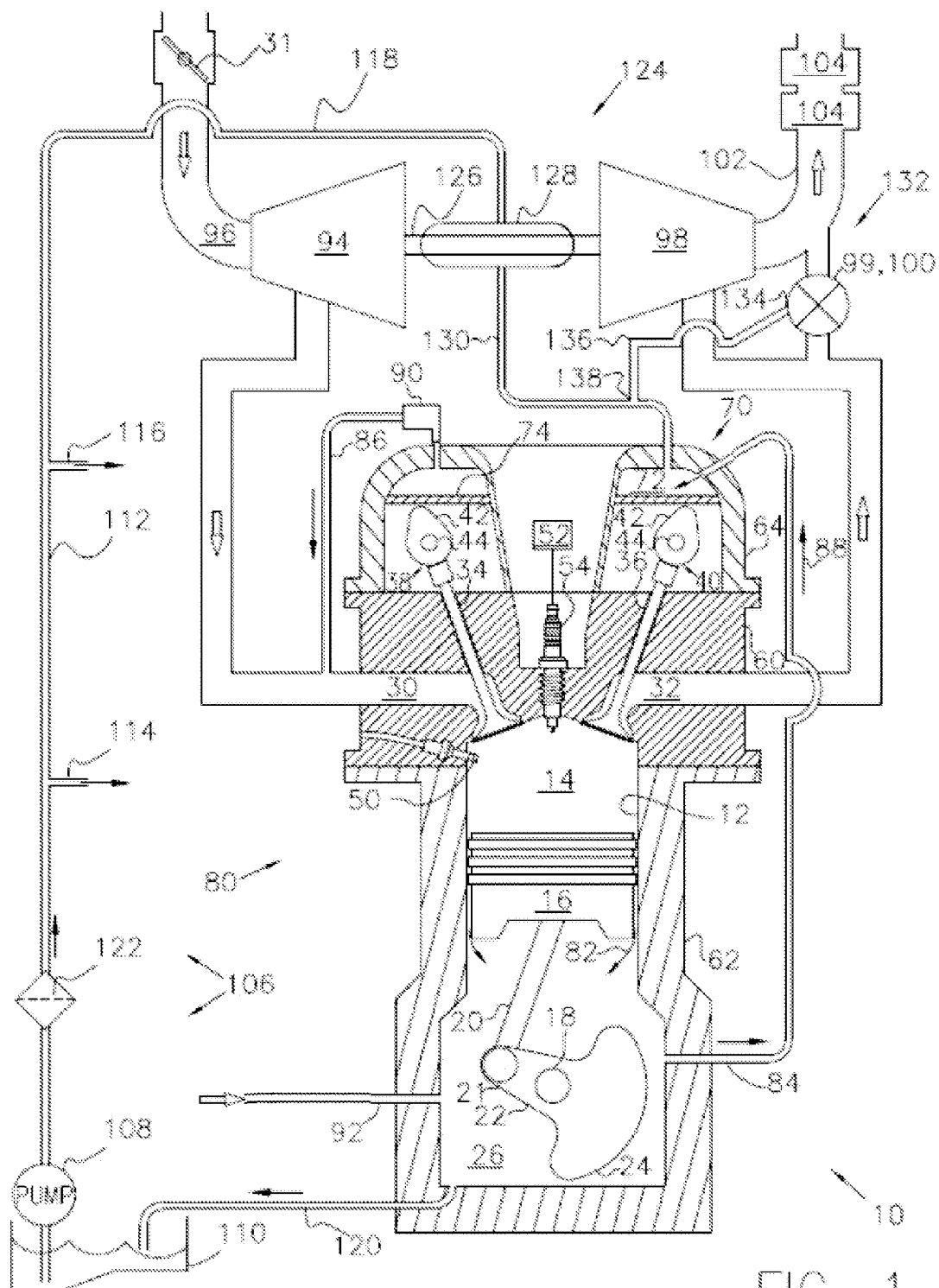
FIG. 1a is a cross-sectional diagram of an example engine having a juncture at an oil return line in accordance with the present disclosure.
Figure 1B:
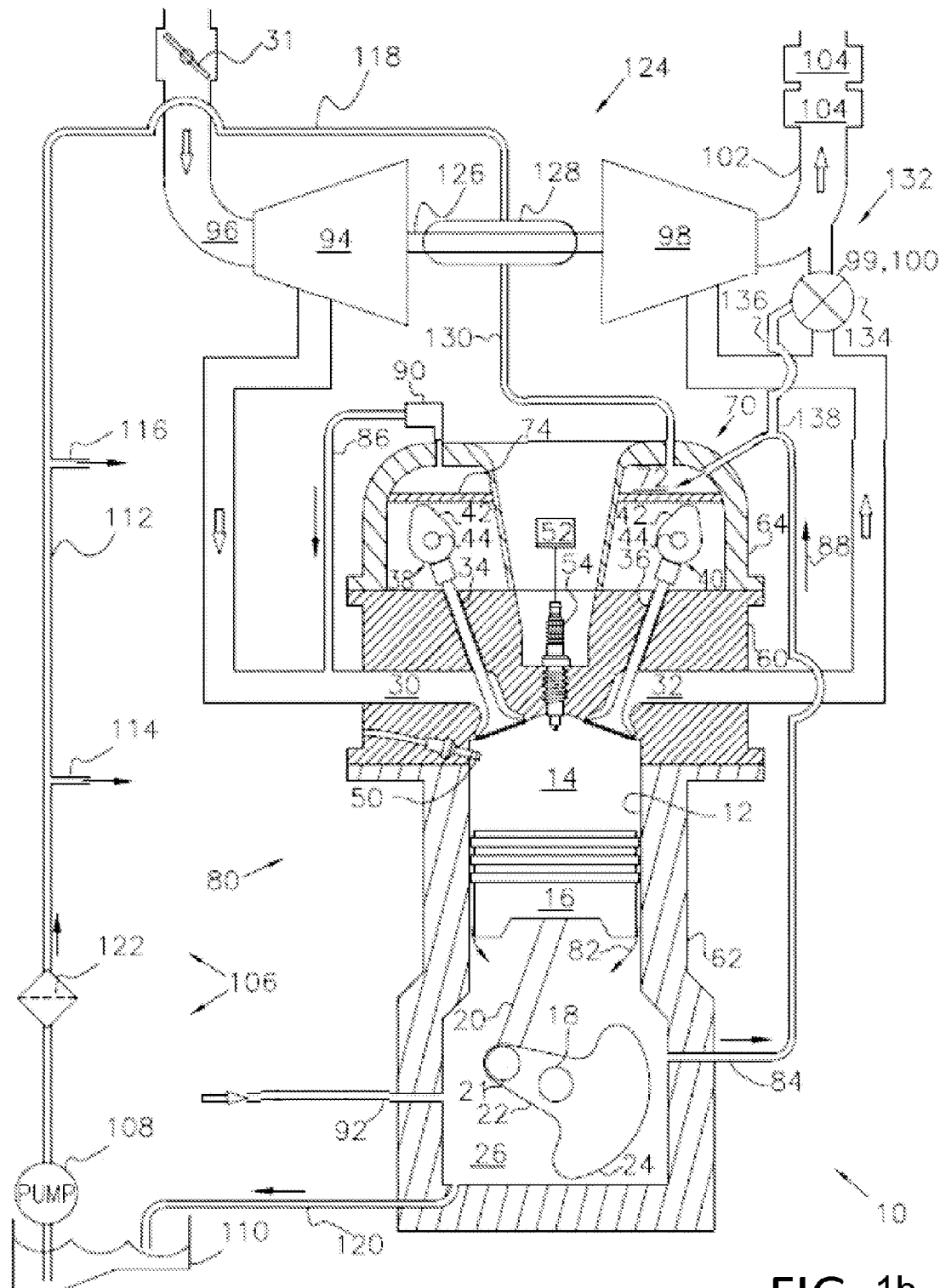
FIG. 1b is a cross-sectional diagram of an example engine having a juncture at a breather passage of a positive crankcase ventilation system in accordance with the present disclosure.
Figure 1C:
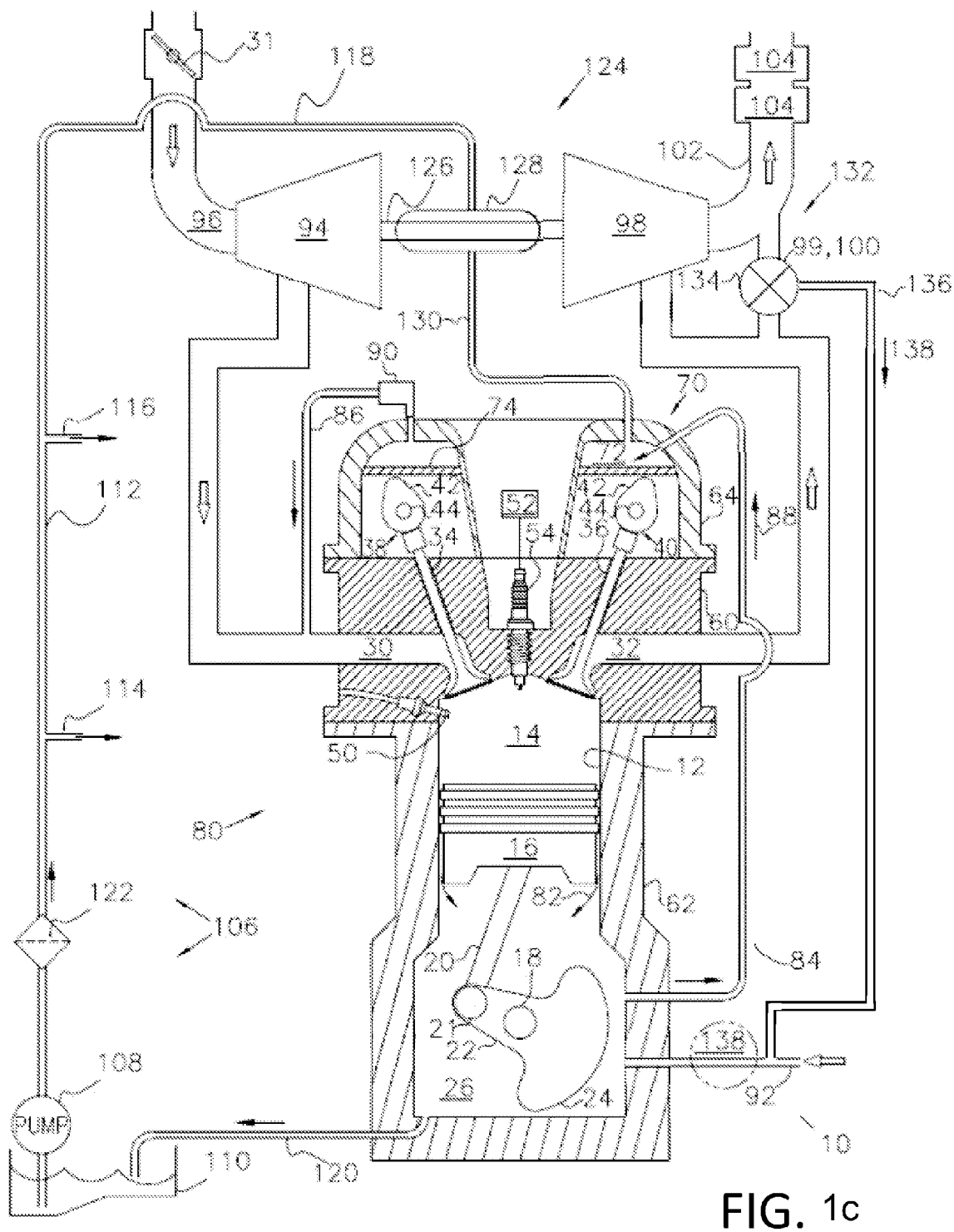
FIG. 1c is a cross-sectional diagram of an example engine having a juncture at a first crankcase ventilation line in accordance with the present disclosure.

FIGS. 1a-1c are cross-sectional diagrams illustrating a cross-section of an engine 10 in accordance with the present disclosure. Various features of the engine may be omitted, or illustrated in a simplified fashion for ease of understanding of the current description. For example, areas may include continuous cross hatching that may otherwise indicate a solid body, however actual embodiments may include various engine components, and/or hollow, or empty, portions of the engine with the cross hatched areas.

FIG. 1 is a cross-sectional view through one cylinder 12 of the engine 10. Various components of the engine 10 may be controlled at least partially by a control system that may include a controller (not shown), and/or by input from a vehicle operator via an input device such as an accelerator pedal (not shown). The cylinder 12 may include a combustion chamber 14. A piston 16 may be positioned within the cylinder 12 for reciprocating movement therein. The piston 16 may be coupled to a crankshaft 18 via a connecting rod 20, a crank pin 21, and a crank throw 22 shown here combined with a counterweight 24. Some examples may include a discrete crank throw 22 and counterweight 24. The reciprocating motion of the piston 16 may be translated into rotational motion of the crankshaft 18. The crankshaft 18, connecting rod 20, crank pin 21, crank throw 22, and counterweight 24, and possibly other elements not illustrated may be housed in a crankcase 26. The crankcase 26 may hold oil. Crankshaft 18 may be coupled to at least one drive wheel of a vehicle via an intermediate transmission system. Further, a starter motor may be coupled to crankshaft 18 via a flywheel to enable a starting operation of engine 10.

Combustion chamber 14 may receive intake air from an intake passage 30. Or intake passage, and may exhaust combustion gases via exhaust passage 32. Intake passage 30 and exhaust passage 32 may selectively communicate with combustion chamber 14 via respective intake valve 34 and exhaust valve 36. A throttle 31 may be included to control an amount of air that may pass through the intake passage 30. In some embodiments, combustion chamber 14 may include two or more intake valves and/or two or more exhaust valves.

In this example, intake valve 34 and exhaust valve 36 may be controlled by cam actuation via respective cam actuation systems 38 and 40. Cam actuation systems 38 and 40 may each include one or more cams 42 and may utilize one or more of cam profile switching (CPS), variable cam timing (VCT), variable valve timing (VVT) and/or variable valve lift (VVL) systems that may be operated by the controller to vary valve operation. The cams 42 may be configured to rotate on respective revolving camshafts 44. As depicted, the camshafts 44 may be in a double overhead camshaft (DOHC) configuration, although alternate configurations may also be possible. The position of intake valve 34 and exhaust valve 36 may be determined by position sensors (not shown). In alternative embodiments, intake valve 34 and/or exhaust valve 36 may be controlled by electric valve actuation. For example, cylinder 16 may include an intake valve controlled via electric valve actuation and an exhaust valve controlled via cam actuation including CPS and/or VCT systems.

In one embodiment, twin independent VCT may be used on each bank of a V-engine. For example, in one bank of the V, the cylinder may have an independently adjustable intake cam and exhaust cam, where the cam timing of each of the intake and exhaust cams may be independently adjusted relative to crankshaft timing.

Fuel injector 50 is shown coupled directly to combustion chamber 14 for injecting fuel directly therein in proportion to a pulse width of a signal that may be received from the controller. In this manner, fuel injector 50 provides what is known as direct injection of fuel into combustion chamber 14. The fuel injector 50 may be mounted in the side of the combustion chamber 14 or in the top of the combustion chamber 14, for example. Fuel may be delivered to fuel injector 50 by a fuel system (not shown) including a fuel tank, a fuel pump, and a fuel rail. In some embodiments, combustion chamber 14 may alternatively or additionally include a fuel injector arranged in intake passage 30 in a configuration that provides what is known as port injection of fuel into the intake port upstream of combustion chamber 14.

Ignition system 52 may provide an ignition spark to combustion chamber 14 via spark plug 54 in response to a spark advance signal from the controller, under select operating modes. Though spark ignition components are shown, in some embodiments the combustion chamber 14 or one or more other combustion chambers of engine 10 may be operated in a compression ignition mode, with or without an ignition spark.

Cylinder head 60 may be coupled to a cylinder block 62. The cylinder head 60 may be configured to operatively house, and/or support, the intake valve(s) 34, the exhaust valve(s) 36, the associated valve actuation systems 38 and 40, and the like. Cylinder head 60 may also support camshafts 44. A cam cover 64 may be coupled with and/or mounted on the cylinder head 60 and may house the associated valve actuation systems 38 and 40, and the like. Other components, such as spark plug 54 may also be housed and/or supported by the cylinder head 60. A cylinder block 62, or engine block, may be configured to house the piston 16. In one example, cylinder head 60 may correspond to a cylinder 12 located at a first end of the engine. While FIG. 1 shows only one cylinder 12 of a multi-cylinder engine 10, each cylinder 12 may similarly include its own set of intake/exhaust valves, fuel injector, spark plug, etc.

FIG. 1 also illustrates an oil separator 70 which may include an oil separation chamber 72 and bottom plate 74, which may define a bottom of the oil separation chamber 72. The oil separator 70 may be included in the cam cover 64 as illustrated, or may be located in another location within, or associated with, the engine 10. The bottom plate 74, and/or the oil separation chamber 72 may be mounted on, or in and/or supported by cylinder head 64. The oil separator 70 may extend lengthwise along a portion of the length of the engine bank, that is, in a direction substantially parallel with the axes of the camshafts 44. Oil separator 70 may be considered to include the cam cover 64. One or more baffles (not shown) may be included with the oil separator 70.

Oil separator 70 may be included as part of an engine crankcase ventilation system 80. The engine crankcase ventilation system 80 may be a positive crankcase ventilation system, or (PCV) system 80. The engine crankcase ventilation system 80 may be included with the engine 10 to mitigate an amount of undesirable exhaust gases that may be emitted from the engine 10. During operation some blow-by gasses 82, as illustrated in FIG. 1 with arrows may pass from the combustion chamber 14 to the crankcase 26. Some of the blow-by gasses 82 may be incompletely combusted, and may be reintroduced into the combustion chamber 14 via a first crankcase ventilation line 84, a second crankcase ventilation line 86, and the intake passage 30 in an attempt to combust them more completely. However, the blow-by gasses 82 may include suspended oil picked up in the stream of gasses from one or more locations within the engine such as the crankcase 26. In an attempt to separate the suspended oil from the blow-by gasses 82 the mixture of oil and blow-by gasses 88, as illustrated with an arrow may be first passed through the oil separator 70.

A flow level of the crankcase ventilation gases through the engine crankcase ventilation system 80 may be controlled by one or more mechanism which may include a valve 90. In some cases the valve 90 may be referred to as a Positive Crankcase Ventilation (PCV) valve. In some cases a breather tube 92 or breather passage, or the like, may be included to add clean air into the crankcase 26 in order to purge, or reduce the concentration of undesirable crankcase gases. In some cases the breather tube 92 may be fluidically coupled with the intake manifold, and/or intake passage 30 as a source of clean air.

A turbo compressor 94 may be disposed on an induction air path 96 for compressing an induction fluid before the induction fluid is passed to the intake passage 30 of the engine 10. In some applications, an inter-cooler (not shown) may be included to cool the intake charge before it enters the engine. The turbo compressor 94 may be driven by an exhaust turbine 98 which may be driven by exhaust gasses leaving the exhaust manifold 32. In some cases, the throttle 31 may be downstream from the turbo compressor 94 instead of upstream as illustrated. Although not illustrated, the engine 10 may include an exhaust gas recirculation EGR line and/or EGR system.

The flow of exhaust gasses may be regulated, or controlled by one or more exhaust gas flow directing mechanisms 99. For example the engine 10 may include a wastegate 100 configured to divert exhaust gases away from the exhaust turbine 98 and to an exhaust line 102. Diverting the exhaust gases may help regulate the speed of the exhaust turbine 98 which in turn may regulate the rotating speed of the turbo compressor 94. The wastegate 100 may be configured as a valve. The wastegate 100 may be used to regulate, for example, a maximum boost pressure in the turbocharger system, which may help protect the engine and the turbocharger.

The exhaust line 102 may include one or more emission control devices 104, which may be mounted in a close-coupled position in the exhaust line 102. The one or more emission control devices 104 may include, for example, a three-way catalyst, lean NOx trap, diesel particulate filter, oxidation catalyst, etc.

The engine 10 may include an engine lubrication system 106, for example an oil lubrication system, which may include an oil pump 108, or other actuation means, to pump, and/or to pressurize, oil to move through the lubrication system 106. The oil pump 108 may be configured to suck oil from an oil reservoir, stored in oil pan 110, through a supply channel 112. The lubrication system 106 may include various branches 114, 116, 118 to provide oil to various oil subsystems. Oil may be returned through one or more return paths which may include a return channel 120 wherein the oil may run or drip back to the oil pan 110. Oil may be filtered with oil filter 122. The oil subsystems may utilize oil flow to perform some function, such as lubrication, actuation of an actuator, etc. Example, subsystems may include lubrication systems, such as passageways for delivering oil to moving components, such as the camshafts, cylinder valves, etc. Other oil subsystems may include hydraulic systems with hydraulic actuators and hydraulic control valves. There may be fewer or more oil subsystems than as shown in the illustrated example.

One oil subsystem may be a turbine bearing lubrication system 124 which may receive oil via a turbine oil supply branch 118. The turbo compressor 94 may be coupled for rotation with the exhaust turbine 98 via a turbine shaft 126. The turbine shaft 126 may be supported for rotation by turbine bearings 128, and may be lubricated with the turbine bearing lubrication system 124. The oil may be returned to other parts of the engine 10 for recirculation, filtration, etc. via oil return line 130.

As mentioned, the wastegate 100 may be an example of an exhaust gas flow directing mechanism 99. The engine 10 may also include other exhaust gas flow directing mechanisms which may be configured to control, and/or to direct, the flow of exhaust gases in and/or around the engine 10. The one or more exhaust gas flow directing mechanisms 99 may, in some cases leak various amounts of untreated exhaust to the environment due to, for example, small clearances between mating parts, and/or due to imperfect and/or aging seals. In many cases the leak(s) may be small but may still be noticeable and/or detectable. As emission sources are increasingly scrutinized relatively smaller leaks may be increasingly significant.

Embodiments in accordance with the present disclosure may provide an exhaust gas management arrangement 132 for an engine 10. The exhaust gas management arrangement 132 may include a port 134 disposed to capture an exhaust gas leaked from a movable portion, and/or mating components of an exhaust gas flow directing mechanism 99. The exhaust gas management arrangement 132 may also include a passage 136 to direct the leaked exhaust gas to a crankcase 26 of the engine 10. In this way, even a relatively small leak may be controlled and instead be treated in accordance with preferred and/or established methods. The passage 136 may be fluidically coupled with a fluid carrying body at one or more junctures 138. Example fluid carrying bodies that may be appropriate elements for the one or more junctures 138 may include but may not be limited to the first crankcase ventilation line 84 and the breather tube 92. The one or more junctures 138 may provide fluidic access to the positive crankcase ventilation system (PCV) system 80. In this way, gasses leaked from the one or more exhaust gas flow directing mechanisms 99 may be managed, or handled by the PCV system 80 rather than be leaked to the atmosphere.

In some embodiments the passage 136 may be fluidically coupled with the crankcase 26 via the oil return line 130 for a bearing 128 of a turbocharger. In some embodiments the passage 136 may be fluidically coupled with the crankcase via the cam cover 64. In some embodiments the passage 136 may be fluidically coupled with the crankcase 26 via the cylinder head 60. In some embodiments the passage 136 may be fluidically coupled with the crankcase 26 via the breather passage 92 of the positive crankcase ventilation (PCV) system 80.

FIG. 2 is a cross-sectional view of an example exhaust gas flow directing mechanism 99 that may be a turbocharger wastegate 100; FIG. 3 is a cross-sectional view of another example turbocharger wastegate 100; and FIG. 4 is a cross-sectional view of yet another example turbocharger wastegate 100 in accordance with the present disclosure. Each wastegate 100 may be used with the example engine illustrated in FIG. 1, or another engine. The wastegates 100 illustrated may include similar features and some differences. Similar parts may be identified with similar reference designators.

Each wastegate 100 may include an inlet 140 and an outlet 142. Flow through the Wastegate 100 may be controlled by a valve 144. Each wastegate 100 may include a port 134 disposed to capture an exhaust gas leaked from a movable portion 146 of the wastegate 100. Each wastegate 100 may also include a passage 136 to direct the leaked exhaust gas to a crankcase 26 of the engine 10.

The movable portion 146 may be a rod 148 disposed for movement within a pair of spaced apart bushings 150. The rod 148 may be a valve stem. The passage 136 may include a groove 152 intersecting with the rod between the bushings 150. In some cases the port 134 may be an enclosure 156 in sealing engagement with the exhaust gas flow directing mechanism and defining a volume 158 around a leak possible portion 154 of the exhaust gas flow directing mechanism 99.

In some embodiments, the movable portion 146 may be coupled with a diaphragm 160 which may be moveable in accordance with a pressure within a volume 162 defined between the diaphragm 160 and an encasement 164. The pressure may be varied in accordance with a fluidic connection 166. The fluidic connection 166 may be a boost controller port. A spring 168 may be included to bias the movable portion 146 to, for example, a closed position.

Various embodiments may provide a turbocharger wastegate 100 for an engine 10. The wastegate 100 may include an enclosure 156 in sealing engagement with a leakage possible portion 154 of the wastegate 100. The wastegate 100 may also include a fluid path 136 from the enclosure 156 to a positive crankcase ventilation (PCV) system 80 to move exhaust gas leaked from the wastegate 100 to a crankcase 26 of the engine 10. The fluid path 136 may include an oil return line 130 for a bearing 128 of the turbocharger.

The leakage possible portion 154 of the wastegate may be a rod 148 disposed within a bushing 150 to transmit movement from an actuator 170 to a valve 144. In some cases the rod 148 may be actuated by a lever 172.

In some cases the rod 148 may be actuated by a diaphragm 160. The fluid path 136 may be a groove 152 disposed to intersect with the rod 148. The fluid path 136 may include a gap or space 174 between two portions of the bushing 150. In some cases the turbocharger wastegate 100 may include two bushings 150 having a space 174 therebetween. The rod 148 may be disposed for translational movement within the two bushing 150. The fluid path 136 may include a groove 152 in line with the space 174 between the bushings 150 and disposed to intersect with the rod 148.

Various embodiments may provide a turbocharger wastegate 100 for an engine 10. The wastegate 100 may include an enclosure 156 in sealing engagement with a leakage possible portion 154 of the wastegate 100 and in fluidic communication with a crankcase 26 of the engine 10. In some embodiments the enclosure 156 may be in fluid communication with the crankcase 26 via a positive crankcase ventilation system 80. In some embodiments the enclosure 156 may be in fluid communication with the positive crankcase ventilation system 80 via a turbocharger bearing oil return line 130.

It should be understood that the systems and methods described herein are exemplary in nature, and that these specific embodiments or examples are not to be considered in a limiting sense, because numerous variations are contemplated. Accordingly, the present disclosure includes all novel and non-obvious combinations of the various systems and methods disclosed herein, as well as any and all equivalents thereof.

The invention claimed is:

1. An exhaust gas management arrangement for an engine comprising:
   a port disposed to capture an exhaust gas leaked from a movable portion of an exhaust gas flow directing mechanism,
   the movable portion being disposed within a pair of bushings and the port including an enclosure in sealing engagement with the exhaust gas flow directing mechanism and defining a volume around the bushings; and
   a passage to direct the leaked exhaust gas to an engine crankcase, and
   wherein the passage is fluidically coupled with the crankcase via a breather passage of positive crankcase ventilation (PCV) system.

2. The exhaust gas management arrangement of claim 1, wherein the gas leak is from a turbocharger wastegate.

3. The exhaust gas management arrangement of claim 1, wherein the exhaust gas flow directing mechanism is a turbocharger wastegate.

4. The exhaust gas management arrangement of claim 1, wherein the passage is fluidically coupled with the crankcase via an oil return line for a bearing of a turbocharger.

5. The exhaust gas management arrangement of claim 1, wherein the passage is fluidically coupled with the crankcase via a cam cover.

6. The exhaust gas management arrangement of claim 1, wherein the passage is fluidically coupled with the crankcase via a cylinder head.

7. The exhaust gas management arrangement of claim 1, wherein the movable portion is a rod disposed for movement within the pair of bushings, the passage including a groove intersecting with the rod between the bushings.

8. The exhaust gas management arrangement of claim 1, wherein the port is the enclosure in sealing engagement with the exhaust gas flow directing mechanism and defines a volume around a leak possible portion of the exhaust gas flow directing mechanism.

9. A turbocharger wastegate for an engine comprising:
   an enclosure in sealing engagement with a leakage possible portion of the wastegate; and
   a fluid path from the enclosure to a positive crankcase ventilation (PCV) system to move exhaust gas leaked from the wastegate to a crankcase of the engine wherein the fluid path includes an oil return line for a bearing of a turbocharger.

10. The turbocharger wastegate of claim 9, wherein the leakage possible portion of the wastegate is a rod disposed within a bushing to transmit movement from an actuator to a valve.

11. The turbocharger wastegate of claim 10, wherein the rod is actuated by a lever.

12. The turbocharger wastegate of claim 10, wherein the rod is actuated by a diaphragm.

13. The turbocharger wastegate of claim 10, wherein the fluid path is a groove disposed to intersect with the rod.

14. The turbocharger wastegate of claim 10, wherein the fluid path includes a gap between two portions of the bushing.

15. The turbocharger wastegate of claim 9, further comprising two bushings having a space therebetween a rod disposed for translational movement within the two bushings, the fluid path including a groove in line with the space between the bushings and disposed to intersect with the rod.

16. A turbocharger wastegate for an engine comprising:
   an enclosure in sealing engagement with a leakage possible portion of the wastegate and in fluidic communication with a crankcase of the engine, wherein the enclosure is in fluid communication with a positive crankcase ventilation system via a turbocharger bearing oil return line.

* * * * *